United States Patent
Olijnyk et al.

(10) Patent No.: US 7,040,770 B1
(45) Date of Patent: May 9, 2006

(54) EXTERIOR MIRROR

(75) Inventors: Mark Olijnyk, Hallett Cove (AU); Patrick McCaffery, O'Halloran Hills (AU); Paul Schwarz, Colonel Light Gardens (AU); Alex Gersch, Glenelg North (AU); Paul VanDeLoo, Norton Summit (AU)

(73) Assignee: Schefenacker Vision Systems Australia Pty Ltd., Lonsdale (AU)

( * ) Notice: Subject to any disclaimer, the term of this patent is extended or adjusted under 35 U.S.C. 154(b) by 275 days.

(21) Appl. No.: 09/692,435

(22) Filed: Oct. 19, 2000

Related U.S. Application Data

(60) Provisional application No. 60/160,390, filed on Oct. 19, 1999.

(51) Int. Cl.
*G02B 5/08* (2006.01)
*G02B 7/18* (2006.01)
*H04B 1/00* (2006.01)

(52) U.S. Cl. .................................. 359/841; 381/86
(58) Field of Classification Search ............... 359/838, 359/841, 844, 850, 871, 872, 877; 248/549, 248/900, 466, 475.1; 381/86
See application file for complete search history.

(56) References Cited

U.S. PATENT DOCUMENTS

| | | | |
|---|---|---|---|
| 4,445,228 A * | 4/1984 | Bruni | 381/24 |
| 5,371,659 A | 12/1994 | Pastrick et al. | |
| 5,477,391 A * | 12/1995 | Boddy | 359/841 |
| 5,497,305 A | 3/1996 | Pastrick et al. | |
| 5,497,306 A | 3/1996 | Pastrick | |
| 5,669,699 A | 9/1997 | Pastrick et al. | |
| 5,669,704 A | 9/1997 | Pastrick | |
| 5,669,705 A | 9/1997 | Pastrick et al. | |
| 5,823,654 A | 10/1998 | Pastrick et al. | |
| 5,863,116 A | 1/1999 | Pastrick et al. | |
| 5,903,402 A * | 5/1999 | Hoek | 359/841 |
| 5,940,230 A * | 8/1999 | Crandall | 359/841 |
| 5,956,181 A * | 9/1999 | Lin | 359/630 |
| 6,022,113 A * | 2/2000 | Stolpe et al. | 359/841 |
| 6,113,241 A * | 9/2000 | Hoek | 359/841 |
| 6,116,743 A * | 9/2000 | Hoek | 359/871 |
| 6,127,919 A * | 10/2000 | Wylin | 340/425.5 |
| 6,130,514 A * | 10/2000 | Oesterholt et al. | 248/900 |
| 6,172,613 B1 * | 1/2001 | DeLine et al. | 340/815.4 |
| 6,278,377 B1 * | 8/2001 | DeLine et al. | 340/815.4 |

FOREIGN PATENT DOCUMENTS

| | | | |
|---|---|---|---|
| DE | 3635 471 A1 | | 4/1988 |
| JP | SHO 62 102739 | | 6/1987 |
| JP | 52250/91 | | 5/1991 |
| JP | 4-358936 | * | 12/1992 |
| JP | 2005-75005 | * | 3/2005 |

* cited by examiner

*Primary Examiner*—Mark A. Robinson
(74) *Attorney, Agent, or Firm*—Warn, Hoffmann, Miller & LaLone, P.C.

(57) ABSTRACT

An exterior mirror for a vehicle, which is forward foldable for storage and shipment of a vehicle. The mirror may also fold to the rear and includes lights and accessories in the sail and the mirror casing.

1 Claim, 9 Drawing Sheets

EXTERIOR MIRROR

CROSS-REFERENCE TO RELATED APPLICATION

The instant plication claims priority to U.S. Provisional Patent Application Ser. No. 60/160,390, filed Oct. 19, 1999.

BACKGROUND OF THE INVENTION

1. Technical Field

The present invention relates generally to a mirror assembly and more particularly to an exterior mirror assembly for a vehicle.

2. Discussion

Due to constraints for shipping vehicles, especially those for large trucks, mirror assemblies for these vehicles are often times not designed with a heavy emphasis on their appearance or functionality. In shipping vehicles, it is frequently a constraint that the mirror assemblies can not extend outwardly of any other portion of the vehicle. Accordingly, mirror assemblies were typically designed as flat as possible so that they could be rotated backward to comply with the above shipping constraint.

Construction of the mirror assembly in this manner often resulted in a device having a generic appearance which did not compliment or accent the appearance of the vehicle in an aesthetically pleasing manner. Furthermore, it was not possible with such designs to utilize the mirror assembly for anything other than housing and supporting a reflective element.

SUMMARY OF THE INVENTION

It is one object of the present invention to provide a mirror assembly which pivots in a forward direction to retract the mirror housings inward from the edges of the vehicle body.

It is another object of the present invention to provide a mirror assembly which includes a housing assembly having a hinged closure member which covers an accessory cavity.

It is a further object of the present invention to provide a mirror assembly having an accessory attachment point which is adapted to fixedly but releasably accept a vehicle accessory.

It is yet another object of the present invention to provide a mirror assembly with a resilient bump strip coupled to the mirror housing assembly to prevent scuffing and damage to the mirror assembly when the mirror assembly is brought into contact with an object.

It is a further object of the present invention to provide a mirror assembly having a housing assembly with improved rigidity.

It is yet another object of the present invention to provide a mirror assembly which may be fabricated in a modular manner to incorporate one or more selectively positionable mirror orientation mechanisms.

A mirror assembly having a housing assembly, a reflective element, a reflective element adjusting mechanism, an attachment assembly and a wire harness is provided. The housing assembly includes a housing which is filled with a structural foam to improve the rigidity of the mirror assembly, and a scalp which according to one embodiment, may be fixedly but removably coupled to the housing. Alternatively, the scalp may be hingedly coupled to the housing to permit access to a cavity formed therebetween. The cavity may be used for storing various articles, including a corded light, or may be used to house a switch unit for controlling various vehicle electrical components, such as a vehicle radio or various vehicle lights. A resilient bump strip may be coupled to the housing to protect the housing from scuffing or damage that results from contact with another object.

Housing assembly houses the reflective element adjusting mechanism and the reflective element. The attachment assembly is coupled to a vehicle at a first end and to the housing assembly at the second end. The attachment assembly preferably includes a pair of laterally extending arms which may be telescoped between a first and second positions to space the housing assembly further from or closer to the vehicle. The pair of laterally extending arms are selectively positionable at an operating position, as well as first and second rotational positions. The first rotational position places the housing against the side of the vehicle proximate a side window. Rotation of the arms in a forward direction places into the second rotational position places the housing inward of the sides of the vehicle above the vehicle fenders or hood.

Additional advantages and features of the present invention will become apparent from the subsequent description and the appended claims, taken in conjunction with the accompanying drawings.

DETAILED DESCRIPTION OF THE PREFERRED EMBODIMENT

Figure 1:
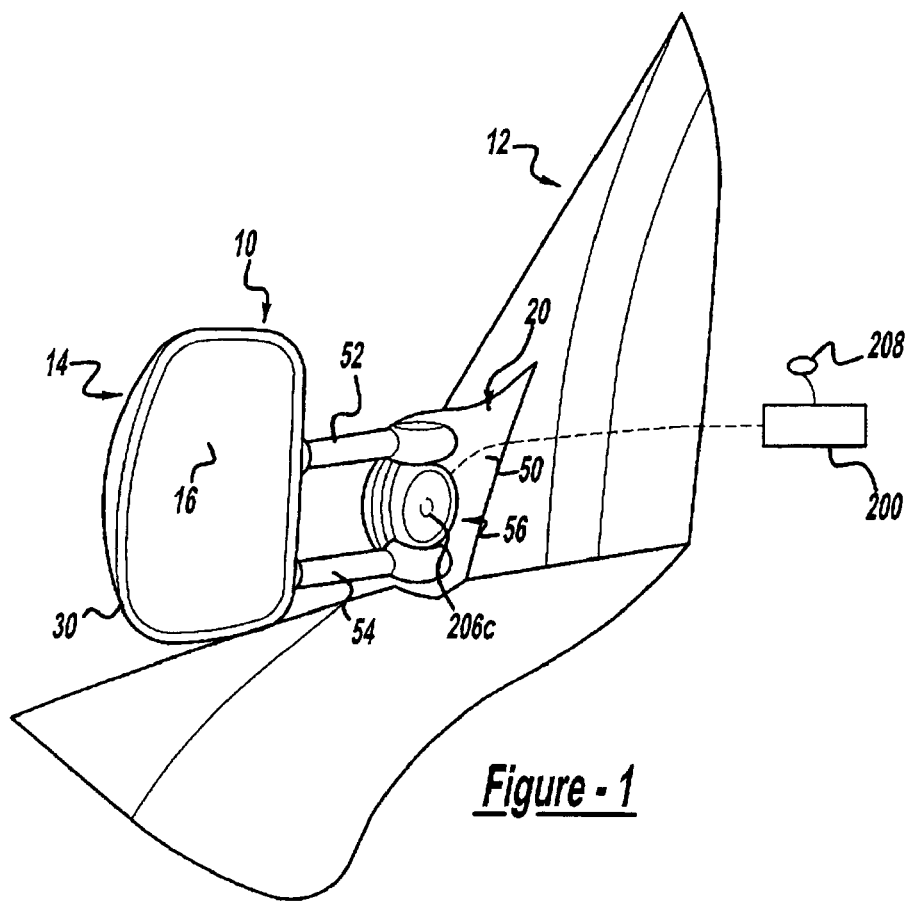
FIG. 1 is a rear perspective view of a portion of a vehicle equipped with a mirror assembly constructed in accordance with the teachings of the present invention.
Figure 2:
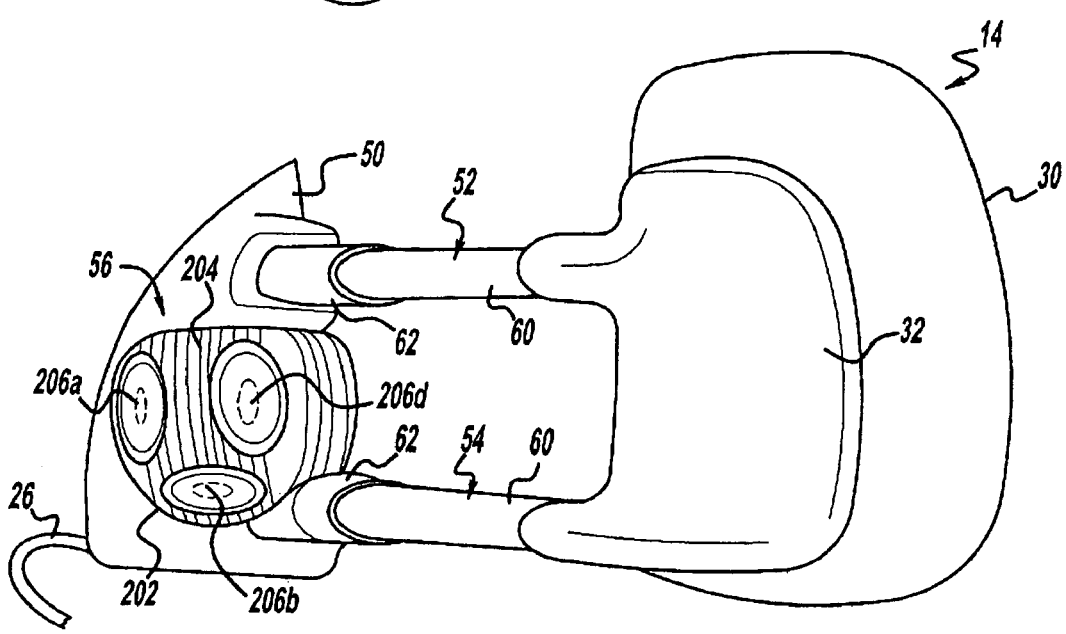
FIG. 2 is a front perspective view of the mirror assembly of FIG. 1.

With reference to FIGS. 1 through 6 of the drawings, a mirror assembly constructed in accordance with the teachings of the present invention is generally indicated by reference numeral 10 and shown in operative association with a vehicle 12. Although the particular vehicle illustrated is a pick-up truck, it will be understood that the teachings of the present invention have applicability to other types of vehicles, and as such, will not be limited in application to pick-up trucks. Furthermore, although mirror assembly 10 is illustrated and described herein as an exterior drivers side rear view mirror which enables the vehicle operator to view an area beside and rearward of vehicle 12, it will be understood that a passengers side rear view mirror may be similarly constructed.

Mirror assembly 10 includes a housing assembly 14, a reflective element 16, a reflective element adjusting means (not shown), an attachment assembly 20, a first drive mechanism 22, a second drive mechanism 24 and a wire harness 26. Wire harness 26 couples the vehicle electrical system to each of the various electrical devices in mirror assembly 10. Housing assembly 14 includes a housing 30 and a scalp 32. Housing 30 is preferably unitarily formed from a molded plastic material and includes a conventional attaching means which is employed to fixedly but removably couple the reflective element adjusting means to housing 30. Housing 30 also houses and supports reflective element 16.

Figure 8A:
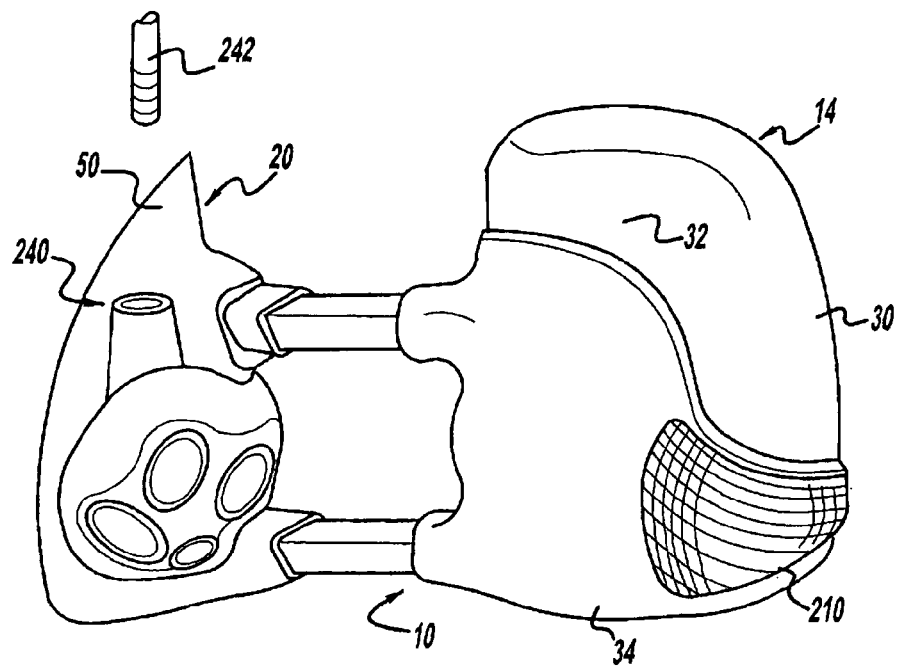
FIG. 8a is a front perspective of a mirror assembly similar to that of FIG. 1 illustrating the incorporation of a turn indicator, an accessory attachment point and a bump strip.
Figure 9:
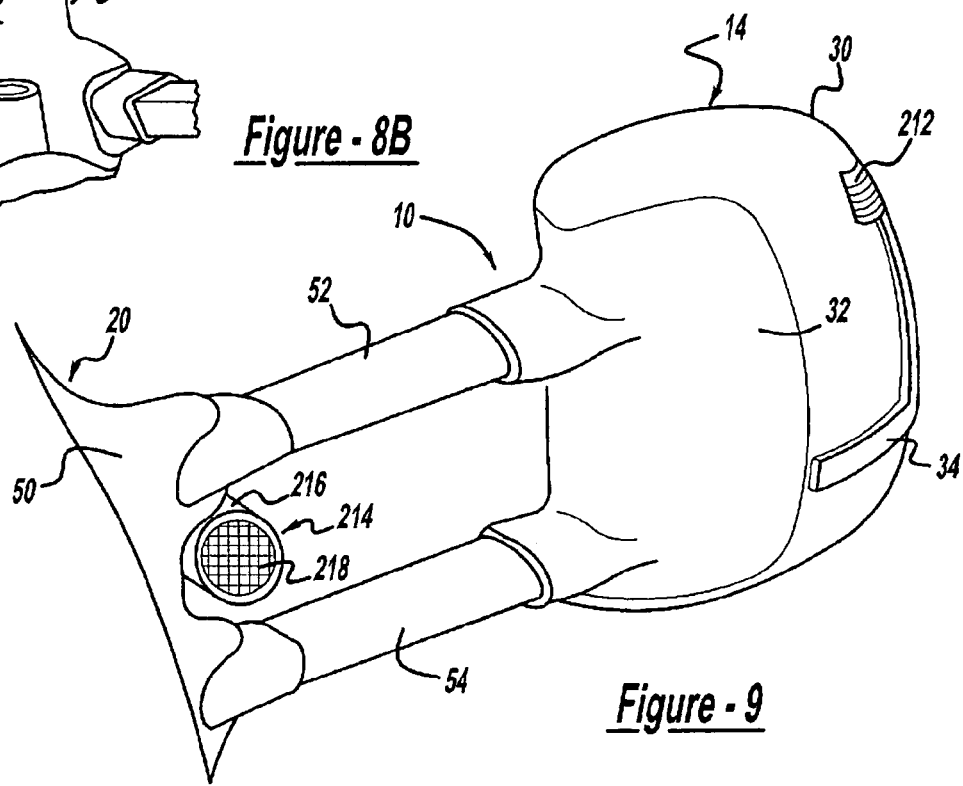
FIG. 9 is a front perspective of a mirror assembly similar to that of FIG. 1 illustrating the incorporation of a marker lamp, a bump strip and a spot light.

With brief reference to FIGS. 8a and 9, a bump strip 34 formed from a soft and resilient material such as rubber or vinyl, may be included on one or more of the exterior surfaces of housing 30 to prevent housing 30 from being scuffed or damaged in the event that it contacts an object. With specific reference to FIG. 8a, bump strip 34 may be contoured or styled in a decorative manner which enhances the appearance of mirror assembly 10. Bump strip 34 preferably covers the forward most and outward most points of housing 30 to ensure that bump strip 34 rather than housing 30 will contact objects first. Bump strip 34 is preferably coupled to housing 30 and/or scalp 32 via double-sided adhesive tape.

Referring back to FIGS. 1 and 2, scalp 32 is also preferably unitarily formed from a molded plastic material. Preferably, a plurality of conventional snap-fasteners are molded into housing 30 and scalp 32 which permits them to be fixedly but removably coupled to one another without the use of threaded fasteners. Alternatively, scalp 32 may be fixedly coupled to housing 30 with a double-sided adhesive tape. With additional reference to FIG. 3, housing 30 and scalp 32 are shown to cooperate to form a cavity 36 which is completely filled with a structural foam 38. Structural foam 38 is preferably a closed-cell polyurethane foam.

Due to the relative ease with which scalp 32 may be coupled to housing 30, scalp 32 may be configured in a manner which enhances the decorative appearance of mirror assembly. For example, scalp 32 may be molded from a colored plastic or painted so as to either match or accent the color of vehicle 12. As another example, a decorative design may be molded into the exterior surface 40 of scalp 32.

The reflective element adjusting means is fixedly but removably coupled to housing 30. Preferably, the reflective element adjusting means is an electronically or manually controlled adjusting mechanism that is well known in the art and which permits the position of the reflective element 16 to adjusted from the passenger compartment of vehicle 12. Alternatively, the reflective element adjusting means is a manually controlled adjusting mechanism that is well known in the art which is actuated by a force directed to reflective element 16.

Reflective element 16 is preferably fixedly but removably coupled to the reflective element adjusting means, and as such is selectively positionable relative to housing 30. In the preferred embodiments of the present invention, reflective element 16 is fabricated from mirror glass, which may be heated and/or may include other characteristics such as electrochromic properties and hydrophobic or hydrophilic coatings. Reflective element 16 may also be constructed in a manner, which permits it to be readily removed from the reflective element adjusting means for servicing of mirror assembly 10, and/or replacement of reflective element 16.

Housing assembly 14 is coupled to attachment assembly 20. In the particular embodiment illustrated, attachment assembly 20 includes a sail portion 50, first and second arms 52 and 54, respectively, and an approach light 56. Sail portion 50 is attached to vehicle 12 via threaded posts or other conventional connectors. A seal is typically interposed between sail portion 50 and vehicle 12 to isolate the interior of vehicle 12 from moisture, dirt and noise.

Each of the first and second arms 52 and 54 include a first laterally extending structure 60 and a second laterally extending structure 62. The first and second laterally extending structures 60 and 62 may be moved in an axial direction relative to one another to permit first and second arms 52 and 54 to telescope inwardly toward vehicle 12 or outwardly therefrom. In the particular embodiment illustrated, first laterally extending structure 60 is fixedly coupled to housing assembly 14 and second laterally extending structure 62 is coupled to sail portion 50.

Figure 3:
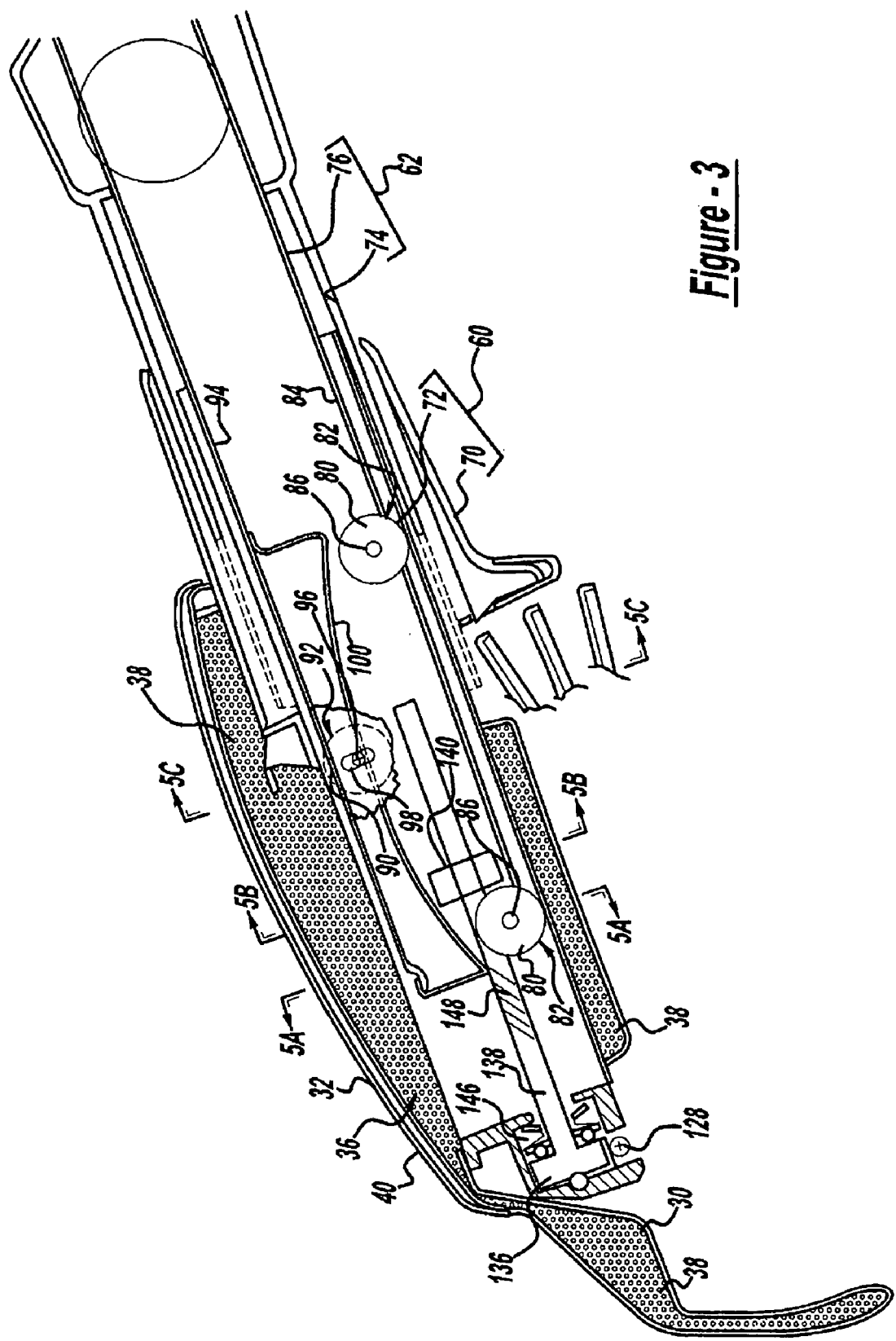
FIG. 3 is a cross-sectional view of the mirror assembly of FIG. 1 illustrating a portion of the first drive mechanism.
Figure 5A:
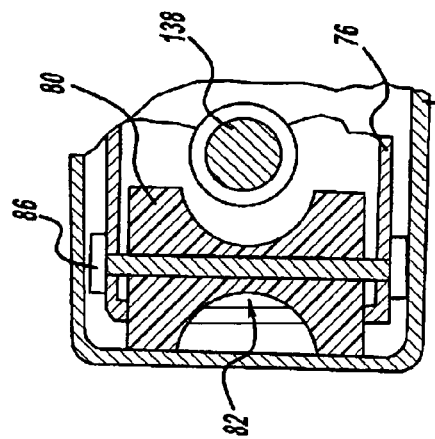
FIG. 5A is an cross-sectional view taken along the line 5A—5A of FIG. 3.
Figure 5C:
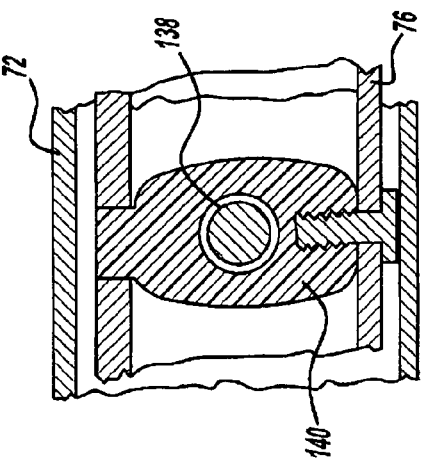
FIG. 5C is an cross-sectional view taken along the line 5C—5C of FIG. 3.
Figure 4:
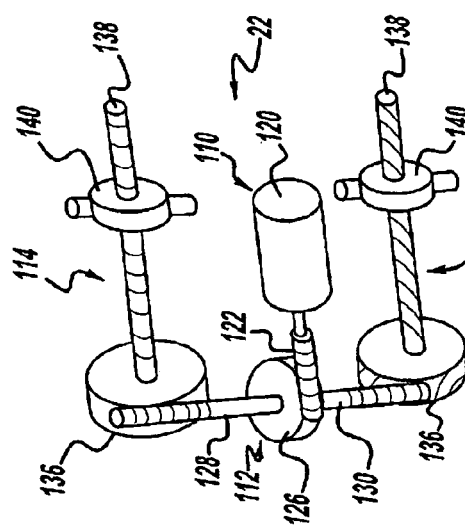
FIG. 4 is a schematic illustration of a portion of the first drive mechanism.
Figure 5B:
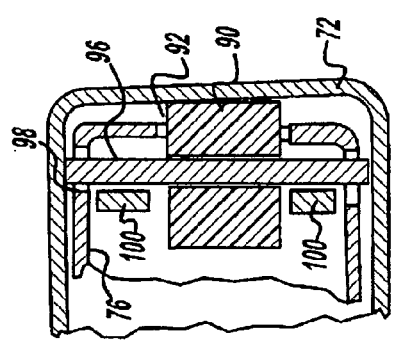
FIG. 5B is an cross-sectional view taken along the line 5B—5B of FIG. 3.

With reference to FIG. 3, each of the first laterally extending structures 60 preferably includes a first cover member 70 and a first tubular member 72 and each of the second laterally extending structures 62 includes a second cover member 74 and a second tubular member 76. The first and second tubular members 72 and 76 are preferably formed at least partially from a square or rectangular tubing.

First tubular member 72 is sized to glidingly receive second tubular member 76. The interior surface of second cover member 74 is spaced apart from second tubular member 76 to permit sliding engagement between first and second tubular members 72 and 76. The interior surface of first cover member 70 is spaced apart from first tubular member 72 to permit sliding engagement between first and second cover members 70 and 74. As the function of the first and second cover members 70 and 74 is primarily cosmetic, they may have cross-sections that are round, square, rectangular, elliptical or any other desired shape.

Each of the second laterally extending structures 62 is disposed at least partially within a respective first laterally extending structure 60. The first and second laterally extending structures 60 and 62 may be moved in an axial direction relative to one another to permit first and second arms 52 and 54 to telescope inwardly toward vehicle 12 or outwardly therefrom. A pair of first rollers 80 are coupled to second tubular member 76 and extend through slots 82 formed in its rear sidewall 84. First rollers 80 are journally supported by a pin 86 for rotation about an axes that are perpendicular to the axis of the first and second arms 52 and 54. A second roller 90 is coupled to an opposite side of second tubular member 76 and extends through a slot 92 formed in its front sidewall 94. Second roller 90 is also journally supported by a pin 96 for rotation about another axis that is perpendicular to the axis of the first and second arms 52 and 54. Pin 96 is disposed in a slot 98 formed in second tubular member 76. A spring 100 is coupled to second tubular member 76 and is operable for urging pin 96 in a direction away from the first rollers 80 and against the inner surface of the first tubular member 72. Each set of first and second rollers 80 and 90 cooperate to control relative movement between the first and second laterally extending structures 60 and 62 in non-axial directions. Structural foam 38 retains first laterally extending structure 60 to housing assembly 14 while providing structural support to inhibit the flexing of the first and second arms 52 and 54 relative to one another.

First drive mechanism 22 is operable for telescoping first and second arms 52 and 54 between an extended position and a retracted position. First drive mechanism 22 may be configured in a manner similar to that disclosed in commonly assigned Australian Provisional Patent Application Serial No. PP8619 filed Feb. 9, 1999 entitled "Means For Extending Or Retracting Telescopic Tubes", which is hereby incorporated by reference as if fully set forth herein.

Alternatively, as shown in FIG. 3 through 5C, first drive mechanism 22 is illustrated as including a motor assembly 110, an intermediate worm structure 112 and upper and lower worm structures 114 and 116. Motor assembly 110 includes a conventional reversible dc motor 120 and a drive worm 122 which is coupled for rotation with the output shaft of motor 120. The housing of motor 120 is fixedly coupled to housing assembly and the output shaft of motor 120 is oriented along an axis parallel to the axes of the first and second arms 52 and 54.

Intermediate worm structure 112 includes an intermediate worm gear 126 and first and second intermediate worm drives 128 and 130.

Intermediate worm structure 112 is coupled to housing assembly 14 for rotation about an axis perpendicular to the axis of the output shaft of motor 120 such that intermediate worm gear 126 meshingly engages drive worm 122.

Upper and lower worm structures 114 and 116 are similar in construction, and as such, only upper worm structure 114 will be discussed in detail. Upper worm structure 114 includes a worm gear 136, a lead screw 138 and a drive member 140. Worm gear 136 meshingly engages first intermediate worm drive 128. A ball bearing 144 and a preload spring assembly 146 cooperate to align worm gear 136 to first intermediate worm drive 128. Worm gear 136 and lead screw 138 are coupled for rotation with one another. Lead screw 138 includes a externally threaded surface 148 which is rotatably supported by first tubular member 72 along the axis parallel to the axis of first arm 52. Drive member 140 includes an internally threaded surface (not shown) which meshingly engages the externally threaded surface 148 of lead screw 138. Drive member 140 is fixedly coupled to the upper and lower surfaces of second tubular member 76.

Rotation of the output shaft of motor 120 therefore causes lead screws 138 to rotate in a corresponding direction which exerts a force onto the drive members 140 to cause the first tubular members 72 to telescope inwardly to or outwardly from their corresponding second tubular members 76.

Figure 6:
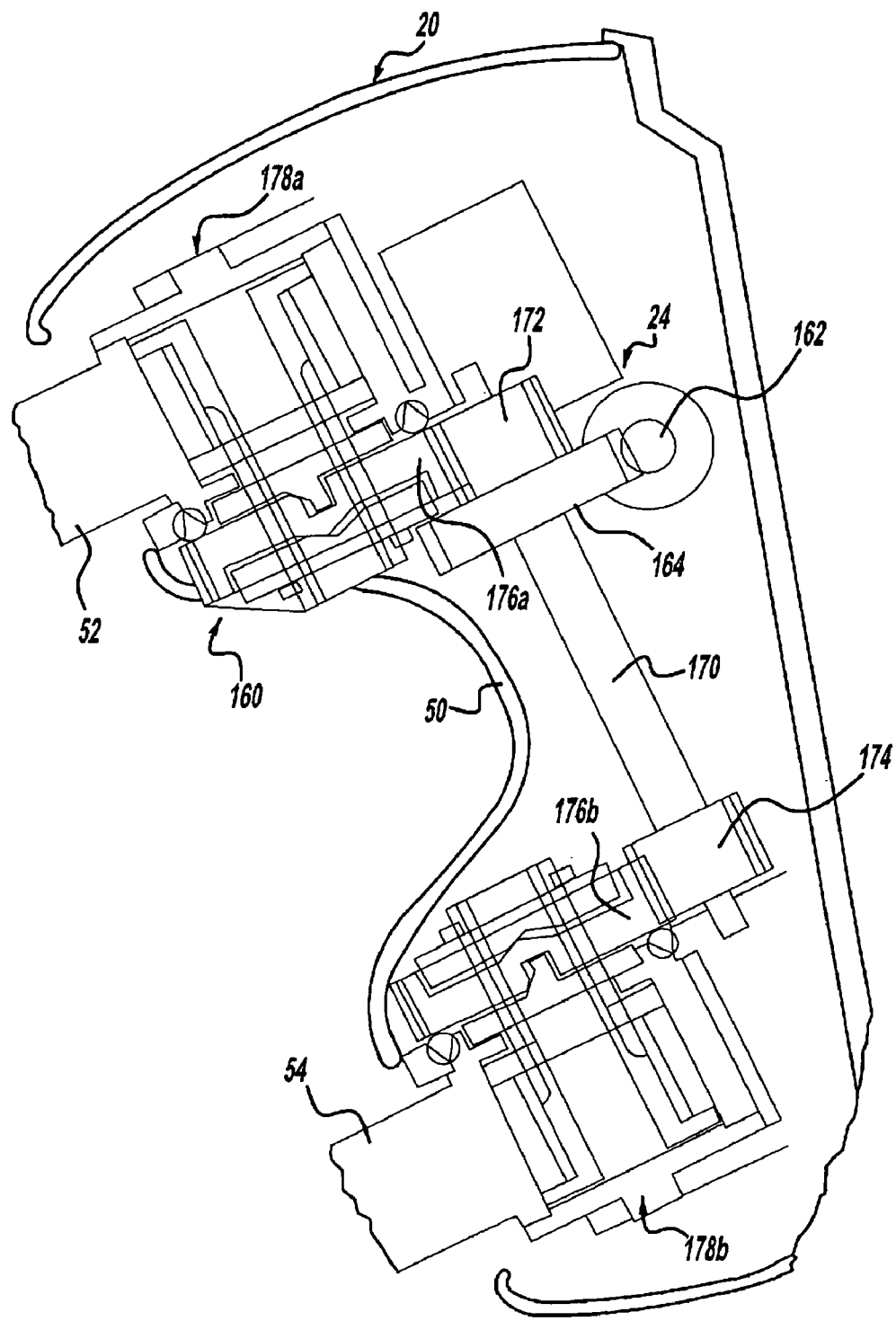
FIG. 6 is a cross-sectional view of the mirror assembly of FIG. 1 illustrating a portion of the second drive mechanism.

Second drive mechanism 24 is illustrated in FIG. 6 as including a drive and clutch system 160 which are similar to the drive and clutch system disclosed in commonly assigned co-pending U.S. patent application Ser. No. 09/085,708 entitled "Mirror Parking System", which is hereby incorporated by reference as if fully set forth herein. Accordingly, this aspect of mirror assembly 10 will not be discussed in detail, other than noting that a powered worm 162 meshingly engages a worm gear 164.

Unlike the above reference drive mechanism, second drive mechanism 24 is shown to include a shaft 170 which is fixed for rotation with worm gear 164. First and second pinions 172 and 174, respectively, are coupled to either end of shaft 170 and fixed for rotation thereon. First and second pinions 172 and 174 are meshingly engaged with a respective drive gear 176 which is supported for rotation about a pivot pin 178. Drive gear 176a is coupled for rotation with first arm 52 and drive gear 176b is coupled for rotation with second arm 54. Accordingly, rotation of powered worm 162 is operable for rotating shaft 170 to cause first and second arms 52 and 54 to rotate simultaneously in a desired direction.

First and second drive mechanisms 22 and 24 may be coupled to a programmable controller 200 which permits the vehicle operator to store a given mirror orientation to memory. The mirror orientation may include information on the position of reflective element 16, as well as the telescopic and rotational positions of housing assembly 14 relative to sail portion 50. Retrieval of the stored mirror orientation causes controller to actuate the first and second drive mechanisms 22 and 24, and the reflective element adjusting means as necessary to adjust the reflective element to the stored mirror orientation.

Alternatively, one or both of the power drive mechanisms may be omitted completely thereby rendering mirror assembly 10 fixing the position of housing assembly 14 relative to vehicle 12. Also alternatively, one or both of the power drive mechanisms may be omitted with a manually actuated mechanism substituted therefor. To control the telescoping movement, a plurality of friction shoes are incorporated into the first and second arms 52 and 54 to provide resistance to their telescopic movement during the operation of vehicle 12. Similarly, to control rotational movement of housing assembly 14, attachment assembly 20 may be fitted with a detent mechanism having a plurality of detents which fixedly but releasably restrain first and second arms 52 and 54 in a desired orientation.

Figure 7:
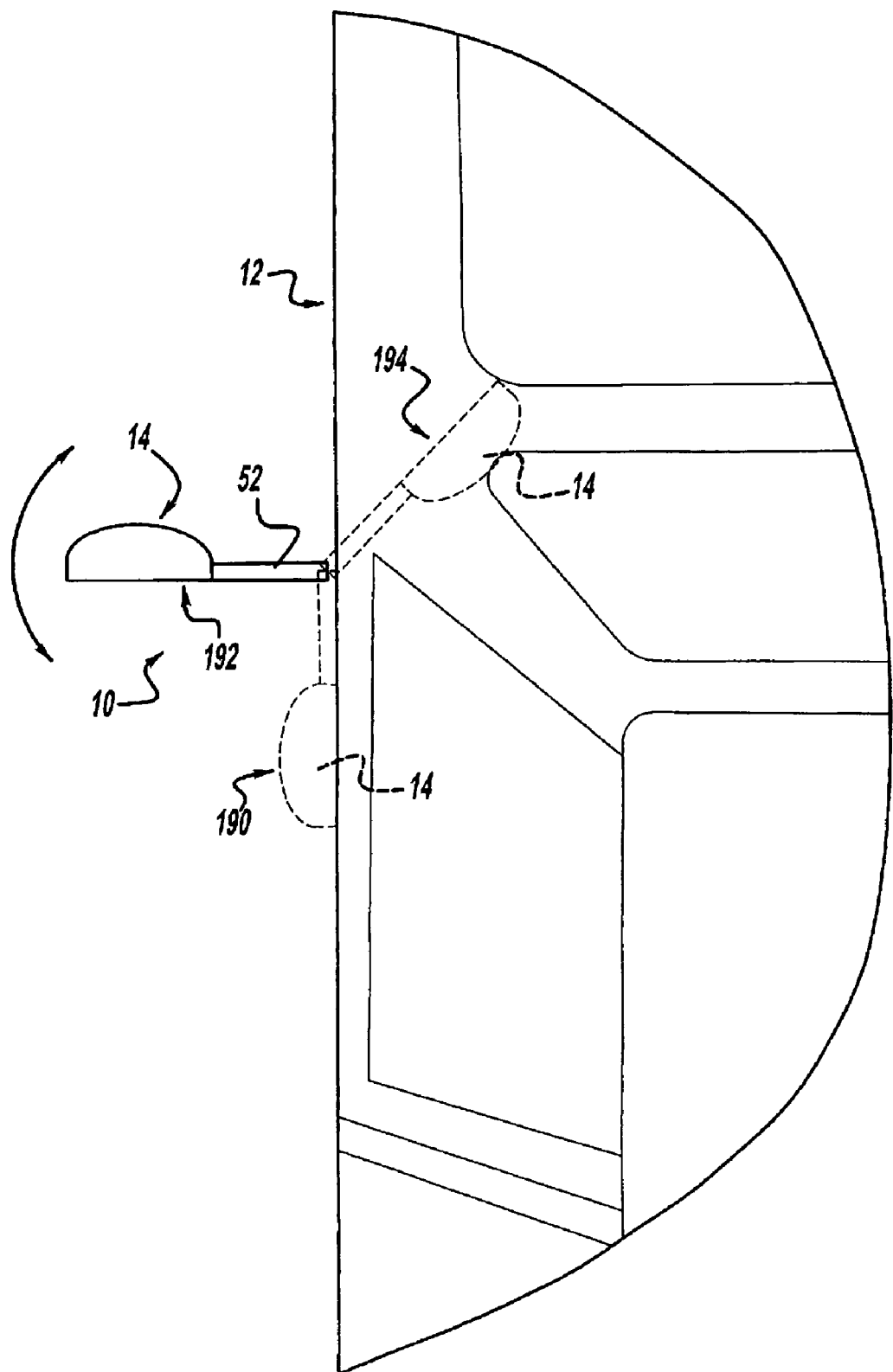
FIG. 7 is a top view of a portion of the vehicle of FIG. 1 illustrating the mirror assembly in several positions.

As illustrated in FIG. 7, mirror assembly 10 is selectively positionable between a rearward retracted position 190, an operational position 192 and a forward-retracted position 194. Mirror assembly 10 is conventionally maintained in the operational position 192 until such time as vehicle 12 is required to approach an object near one or more of its lateral sides. At such time, mirror assembly 10 may then be rotated forward or rearward. Placement of mirror assembly 10 into the rearward retracted position 190 positions housing assembly 14 against the lateral side of vehicle 12 such that housing assembly 14 is proximate the side window. Positioning mirror assembly 10 in this manner may be best suited where vehicle 12 is being operated in a forward direction and it is desirable to protect the mirror assembly from forward impacts, such as when traveling through overgrown trails. This position, however, tends to interfere with the vehicle occupant's ability to move their hands or see through the side window of vehicle, as when at automatic teller machines or the drive-through windows of fast-food restaurants.

In situations such as this, mirror assembly 10 may advantageously be oriented to its forward-rotated position 194 to substantially clear the area proximate the side window of the vehicle 12. This position is also advantageous in that the housing assembly 14 is positioned substantially inward of the lateral side of vehicle 12, thereby permitting housing assembly 14 to be relatively deep in comparison to similar mirrors which can only be rotated to a rearward rotated position 190. Consequently, housing 30 and scalp 32 need not be designed in a relatively flat manner, but may be extended to address aesthetic and aerodynamic issues.

Returning to FIGS. 1 and 2, approach light 56 includes a controller 200, a reflector housing 202 and a lens 204 and a plurality of lamps 206. Illumination of lamp 206a causes an area adjacent vehicle 12 and forward of mirror assembly 10 to be illuminated. Illumination of lamp 206b causes an area adjacent vehicle 12 and below mirror assembly to be illuminated. Illumination of lamp 206c causes an area adjacent vehicle 12 and rearward of mirror assembly 10 to be illuminated. Illumination of lamp 206d causes an area lateral to mirror assembly 10 to be illuminated. Controller 200 is operable for selectively illuminating one or more of the lamps 206 upon the occurrence of a predetermined condition. For example, actuation of a remote keyless entry device or a power lock switch on one of the vehicle doors causes all of the lamps to illuminate so as to illuminate an area around vehicle 12 to aid in the ingress to and egress from vehicle 12. Actuation of the vehicle turn signal lever to turn left, for example, causes lamp 206a to illuminate to provide the vehicle operator with an illuminated view of the area to which vehicle 12 is being turned. Placement of the vehicle gear selector into a reverse gear ratio causes lamp 206c to illuminate, providing the vehicle operator with an illuminated view of an area to the side and behind vehicle 12. Controller 200 preferably includes a remote light switch 208 which permits one or more of the lamps 206 to be illuminated as desired.

Alternatively, approach light 56 may be configured in a manner similar to that disclosed in commonly assigned U.S. Provisional Patent to Andrew J. Assinder entitled "Exterior Mirror Having An Attachment Member Including An Approach Light" which is hereby incorporated by reference as if fully set forth herein.

Other light devices may similarly be incorporated into mirror assembly 10, either in addition to approach light 56 or in substitution thereof. A first example is illustrated in FIG. 8 where a turn indicator 210 is shown coupled to housing 30. Turn indicator 210 may be placed on mirror assembly 10 so as to face in a rearward direction, a sideward direction or both a rearward and a sideward direction. Turn indicator 210 is conventional in its operation in that its actuation is controlled by the vehicle turn signal lever.

A second example is illustrated in FIG. 9 where a side marker 212 is coupled to housing 30. Side marker 212 may be conventionally operated to illuminate when the vehicle parking lights or vehicle head lights are illuminated. Side marker 212 may also be operated to illuminate when vehicle 12 is locked or unlocked and thereafter turned off when vehicle 12 is started or after a predetermined time.

A third example is further illustrated in FIG. 9 wherein mirror assembly 10 is shown to include a spot light 214. Spot light 214 is movably coupled to attachment assembly 20 and located between the first and second arms 52 and 54. Spot light 214 includes a first portion 216 which is fixedly coupled to scalp 50 and a second portion 218 which is selectively positionable relative to first portion 216 via a control mechanism (not shown) which is preferably actuatable from the interior of vehicle 12. The control mechanism may be a manual handle or may be electronically controlled. Preferably, the second portion is gimbaled to the first portion, permitting second portion 218 to focus light in a predetermined area.

Figure 10:
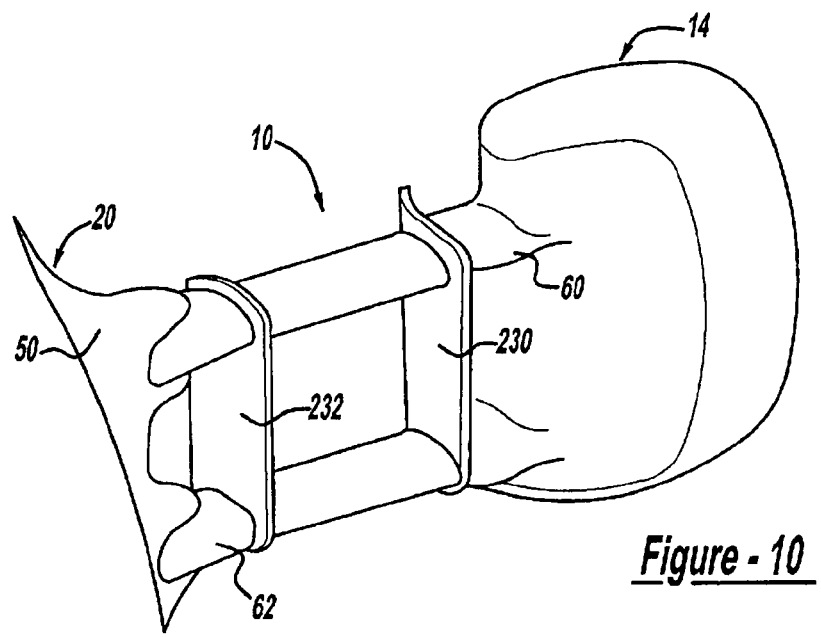
FIG. 10 is a front perspective of a mirror assembly similar to that of FIG. 1 illustrating the incorporation of a spoiler.
Figure 11:
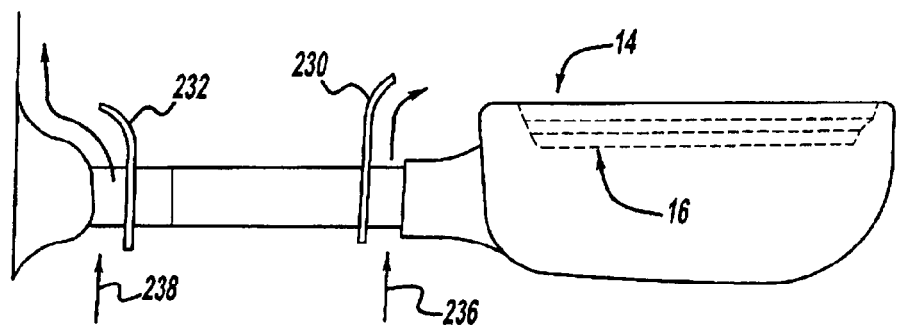
FIG. 11 is a schematic diagram of the mirror assembly of FIG. 10 illustrating the function of the spoilers.

Attachment assembly 20 may also be fitted with various other accessories, such as a spoiler. In FIG. 10, attachment assembly 20 is shown to be fitted with a first spoiler 230 and a second spoiler 232. First spoiler 230 is coupled to the first laterally extending structures 60 so as to be fixed in relation to housing 30. Second spoiler 232 is coupled to the second laterally extending structures 62 so as to be fixed in relation to the vehicle side window. As shown in FIG. 11, first spoiler 230 is configured to deflect a first air flow 236 across reflective element 16 to clear its exterior surface of water and/or contamination. Similarly, second spoiler 232 is configured to deflect a second air flow 238 across the side window to clear it of water and/or contamination. First and second spoilers 230 and 232 may be integrally formed into housing 30 and sail portion 50, respectively, or may separately manufactured permitting them to be supplied to consumers as an after-market product.

An accessory attachment point 240 may be provided in attachment assembly 20 or housing assembly 14. As illustrated in FIG. 8a, accessory attachment point 240 is integrated into sail portion 50 and permits various accessories, such as flags 242 and pennants of various collegiate or professional sports teams to be fixedly but removably coupled to mirror assembly 10.

Figure 8B:
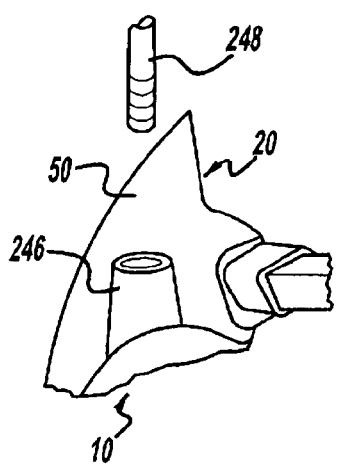
FIG. 8b is a front perspective of a mirror assembly similar to that of FIG. 1 illustrating the incorporation of an antenna attachment point to the sail portion.
Figure 16:
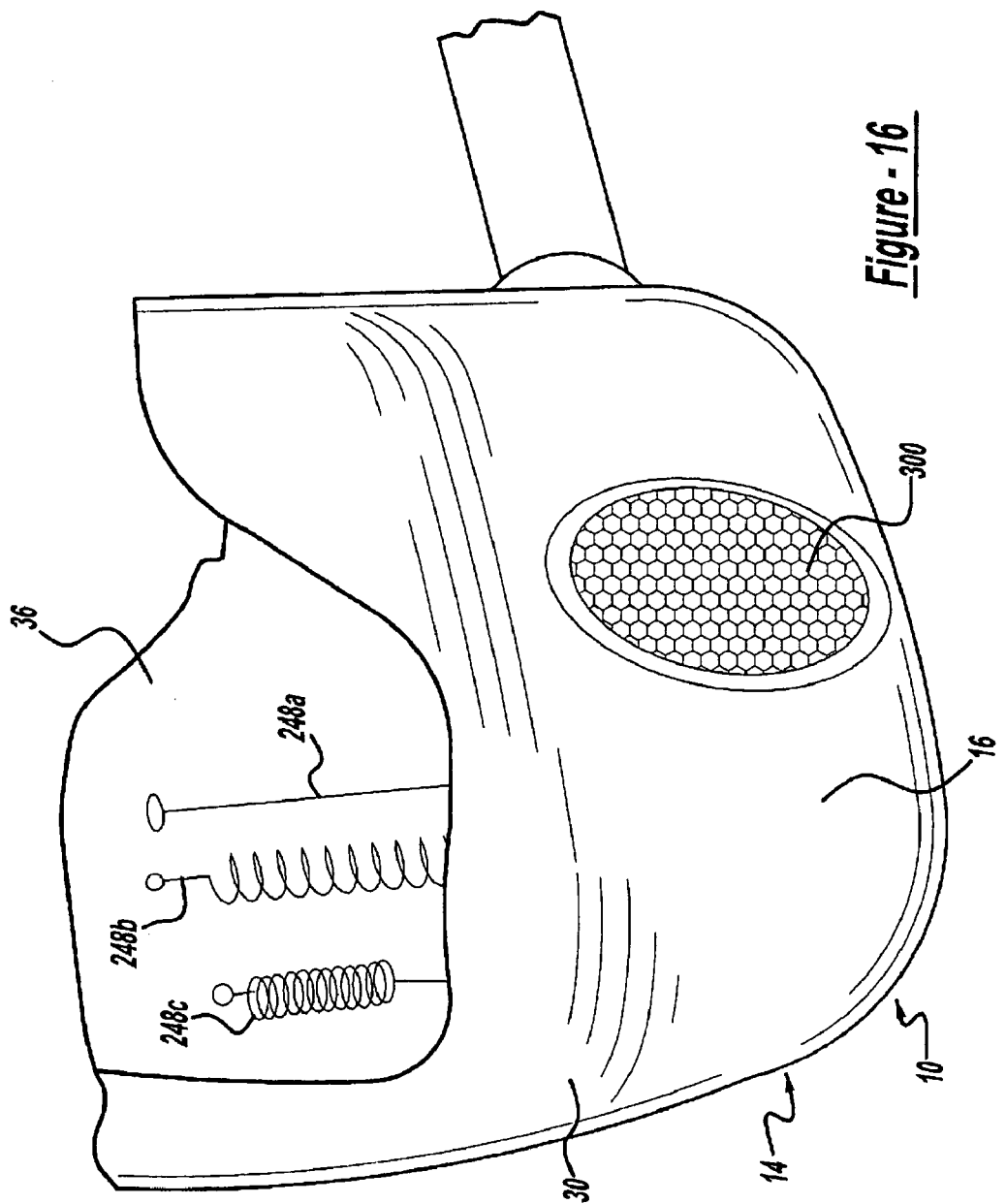
FIG. 16 is a perspective rear view of a mirror assembly similar to that of FIG. 1 illustrating the incorporation of a speaker into the housing.

Similarly, as illustrated in FIG. 8b, an antenna attachment point 246 may also be integrated into mirror assembly 10. Antenna attachment point 246 permits an antenna 248 for one or more of the vehicle radio, a wireless phone and a remote keyless entry device to be coupled to mirror assembly 10. This embodiment is advantageous in that it provides an antenna connection for the desired device without forming a hole in the sheet metal body of vehicle 12. Alternatively, as shown in FIG. 16, antenna 248 may be completely disposed within cavity 36 in housing assembly 14. In the particular embodiment illustrated, antenna 248a is coupled to the vehicle radio, antenna 248b is coupled to a wireless phone and antenna 248c is operable for receiving a remote unlocking/locking signal which is typically generated by a remote keyless entry device.

Figure 12:
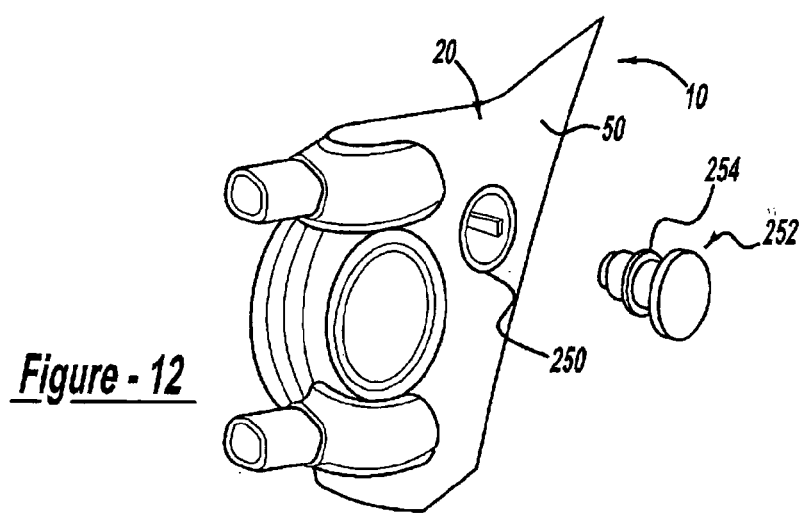
FIG. 12 is a perspective view of a portion of a mirror assembly similar to that of FIG. 1 illustrating the incorporation of a power port into the sail portion.

As illustrated in FIG. 12, another feature that may be integrated into mirror assembly 10 is a power port 250 which uses the electrical system of vehicle 12 to power various accessories, such as hand-held spot lights. A plug assembly 252 having a resilient seal 254 is used to close the cavity of power port 250 to prevent infiltration of water and dirt therein.

Figure 13:
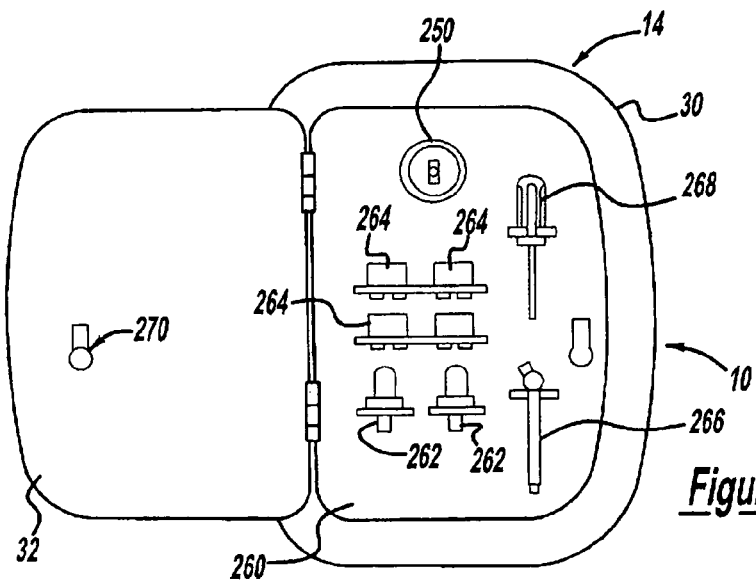
FIG. 13 is a perspective front view of a mirror assembly similar to that of FIG. 1 but illustrating a hinged scalp.
Figure 14:
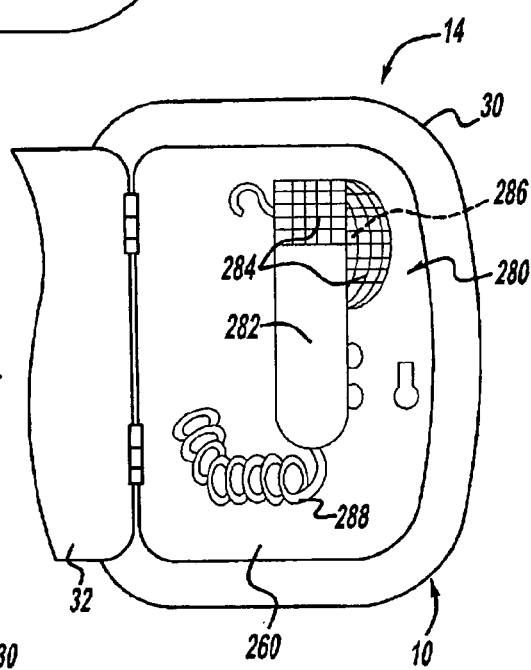
FIG. 14 is a perspective front view of a mirror assembly similar to FIG. 13 illustrating a compartment for a corded light.
Figure 15:
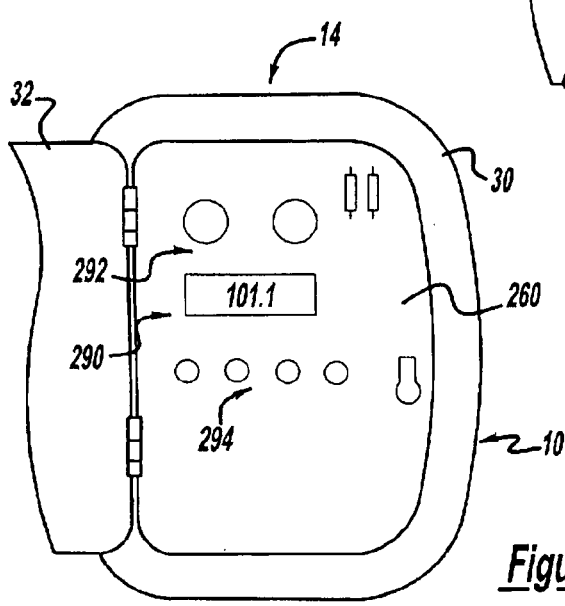
FIG. 15 is a perspective front view of a mirror assembly similar to FIG. 13 but illustrating a switching unit.

FIGS. 13 through 15 illustrate yet another alternative construction of mirror assembly 10. Scalp 32 is shown to be hingedly coupled to housing 30, permitting scalp 32 to be pivoted between a closed position substantially closing the open end of housing 30, and an open position substantially clearing the open end of housing 30. A cavity 260 is formed between scalp 32 and housing 30 which may be used to conceal a power port 250 or to store various items, such as replacement lamps 262, fuses 264 and/or tools such as a pressure gauge 266 and screwdrivers 268. A lock mechanism 270 is incorporated into scalp 32 which is positionable in a locked condition inhibiting the movement of scalp 32 from the closed position to the open position, and an unlocked condition permitting the movement of scalp 32 from the closed position to the open position.

As illustrated in FIG. 14, cavity 260 may be used for storing a corded lamp 280. Corded lamp 280 includes a housing 282, a lens 284, a lamp 286 and a cord portion 288.

Cord portion 288 is electrically coupled to the electrical system of vehicle 12, permitting corded lamp 280 to be moved relative to mirror assembly 10 to provide light to a remote area, as when changing a tire or when examining the engine compartment or bottom side of vehicle 12.

As illustrated in FIG. 15, a switching unit 290 may additionally or alternatively be placed into cavity 260. Switching unit 290 is coupled to various vehicle electrical devices to permit them to be remotely controlled from outside vehicle 12. In the example provided, switching unit 290 includes a set of first controls 292 which are operable for remotely controlling the vehicle radio and a set of second controls 294 which are operable for remotely controlling various vehicle lights. First controls 292 may be actuated to turn the vehicle radio on or off, select a signal medium (e.g., radio signal, cassette tape, compact disc) or adjust various settings such as playback volume, balance, tone. Preferably, first controls 292 are identical in configuration and function to any controls for the vehicle radio which are contained in the vehicle interior. Second controls 294 includes a plurality of switches which may be actuated, either individually or in combination, to illuminate various vehicle lamps. Second controls 294 permits, for example, the vehicle hazard lights to be actuated from the exterior of vehicle 12 as well as an auxiliary light to be illuminated to permit an area of vehicle 12 to be illuminated, as when changing a tire.

One or more audio speakers may also be integrated into mirror assembly 10. As illustrated in FIG. 16, an audio speaker 300 is integrated into housing 30. Audio speaker 300 may be coupled to the vehicle radio to permit the playback of music and other programs outside of vehicle 12. Audio speaker 300 may additionally or alternatively be coupled to a microphone inside vehicle 12, permitting the vehicle occupants to broadcast messages to persons outside vehicle 12. Audio speaker 300 may additionally or alternatively be configured as a siren to produce a warning signal to alert persons to the presence of vehicle 12. Also alternatively, audio speaker 300 may be integrated into attachment assembly 20 in sail portion 50 or to a bracket (not shown) which is coupled to first and second arms 52 and 54.

While the invention has been described in the specification and illustrated in the drawings with reference to a preferred embodiment, it will be understood by those skilled in the art that various changes may be made and equivalents may be substituted for elements thereof without departing from the scope of the invention as defined herein. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention.

We claim:

1. An exterior mirror for a vehicle comprising:
   a mirror housing assembly including a reflective element normally facing in a direction for viewing rearward;
   an attachment assembly including at least one attachment arm and a sail portion for attaching the mirror housing assembly to the exterior of the vehicle, said sail portion being directly attached to the vehicle, said sail portion including a microphone/speaker; and
   a folding mechanism operably folding and maintaining the mirror in a forward direction whereby the overall width dimension of the vehicle is reduced.

* * * * *